(12) United States Patent
Tenbrink et al.

(10) Patent No.: US 11,167,997 B2
(45) Date of Patent: Nov. 9, 2021

(54) METHOD FOR PRODUCING SYNGAS, AS WELL AS SYNGAS COOLING ASSEMBLY AND USE

(71) Applicants: thyssenkrupp Industrial Solutions AG, Essen (DE); thyssenkrupp AG, Essen (DE)

(72) Inventors: Norbert Tenbrink, Dortmund (DE); Maximilian Berger, Dortmund (DE)

(73) Assignees: thyssenkrupp Industrial Solutions AG, Essen (DE); thyssenkrupp AG, Essen (DE)

( * ) Notice: Subject to any disclaimer, the term of this patent is extended or adjusted under 35 U.S.C. 154(b) by 143 days.

(21) Appl. No.: 16/497,494

(22) PCT Filed: Mar. 27, 2018

(86) PCT No.: PCT/EP2018/057712
§ 371 (c)(1),
(2) Date: Sep. 25, 2019

(87) PCT Pub. No.: WO2018/184903
PCT Pub. Date: Oct. 11, 2018

(65) Prior Publication Data
US 2021/0107800 A1 Apr. 15, 2021

(30) Foreign Application Priority Data
Apr. 5, 2017 (DE) .................. 10 2017 205 780.7

(51) Int. Cl.
*B01J 19/00* (2006.01)
*B01J 19/24* (2006.01)
(Continued)

(52) U.S. Cl.
CPC ......... *C01C 1/0452* (2013.01); *B01J 19/0013* (2013.01); *B01J 19/245* (2013.01);
(Continued)

(58) Field of Classification Search
CPC .... B01J 19/00; B01J 19/0006; B01J 19/0013; B01J 19/24; B01J 19/245; B01J 2219/00;
(Continued)

(56) References Cited

U.S. PATENT DOCUMENTS

| 3,441,393 A | 4/1969 | Finneran |
| 4,756,722 A | 7/1988 | Knop |

(Continued)

FOREIGN PATENT DOCUMENTS

| DE | 3600432 A | 2/1987 |
| EP | 0860673 A | 8/1998 |
| WO | 2009070189 A | 6/2009 |

OTHER PUBLICATIONS

Pattabathula et al., Introduction to Ammonia Production, American Institute of Chemical Engineers (AIChE), CEP, Sep. 2016 (Year: 2016).*

(Continued)

*Primary Examiner* — Natasha E Young
(74) *Attorney, Agent, or Firm* — thyssenkrupp North America, LLC

(57) ABSTRACT

A method of producing synthesis gas in a dual pressure level ammonia plant having a first synthesis section operated in once through fashion at a first relatively lower high pressure and having a second synthesis section operated in recirculating fashion at a second relatively higher high pressure. In the first synthesis section downstream of an OT reactor of the first synthesis section the synthesis gas is cooled using cooling medium at a pressure below the first high pressure, wherein the cooling medium is provided at a pressure below the first high pressure level by means of a medium pressure steam generator or wherein the cooling is effected by means of the medium pressure steam generator. The disclosure further relates to a synthesis gas cooling assembly in such a (Continued)

dual pressure level ammonia plant and at least one plant component for providing or for utilizing the cooling medium.

14 Claims, 2 Drawing Sheets

(51) Int. Cl.
    *C01B 3/00*     (2006.01)
    *C01B 3/02*     (2006.01)
    *C01C 1/00*     (2006.01)
    *C01C 1/04*     (2006.01)

(52) U.S. Cl.
    CPC ............ *C01B 3/025* (2013.01); *C01C 1/0417* (2013.01); *B01J 2219/0004* (2013.01); *B01J 2219/00103* (2013.01)

(58) Field of Classification Search
    CPC .... B01J 2219/00002; B01J 2219/00027; B01J 2219/0004; B01J 2219/00049; B01J 2219/00051; B01J 2219/00074; B01J 2219/00087; B01J 2219/00103; C01B 3/00; C01B 3/02; C01B 3/025; C01C 1/00; C01C 1/04; C01C 1/0405; C01C 1/0417; C01C 1/0447; C01C 1/0452

See application file for complete search history.

(56) References Cited

U.S. PATENT DOCUMENTS

| | | | |
|---|---|---|---|
| 7,867,465 B2 * | 1/2011 | Blanchard | ............ C01C 1/0417 423/360 |
| 2004/0042951 A1 | 3/2004 | Lippmann | |
| 2010/0132259 A1 | 6/2010 | Haque | |

OTHER PUBLICATIONS

English Translation of International Search Report issued in PCT/EP2018/057712, dated Jun. 20, 2018.

Kessler et al., First application of Uhdes dual pressure ammonia process for revamping of the Duslo ammonia plant, pp. 1-15, (Mar. 2006).

Lippman et al., Uhde dual-pressure process for large-scale ammonia plants, pp. 56-61, (Jul. 2004).

* cited by examiner

METHOD FOR PRODUCING SYNGAS, AS WELL AS SYNGAS COOLING ASSEMBLY AND USE

CROSS REFERENCE TO RELATED APPLICATIONS

This application is a U.S. National Stage Entry of International Patent Application Serial Number PCT/EP2018/057712, filed Mar. 27, 2018, published as WIPO Patent Publication No. WO2018/184903, which claims priority to German Patent Application No. DE 10 2017 205 780.7, filed Apr. 5, 2017, the entire contents of both of which are incorporated herein by reference.

FIELD

The present disclosure generally relates to a synthesis gas cooling assembly for cooling of synthesis gas.

BACKGROUND

A dual pressure level ammonia plant/a dual pressure level ammonia process is formed from two synthesis sections, namely the classical section having two loop reactors operated at a pressure of about 200 bar and the so-called once through (OT) section which comprises a reactor operated at about 100 bar, i.e. at a markedly lower pressure level. The loop section is operated as a synthesis circuit and the OT section is traversed only once. Such a plant configuration is known in particular by the designation "dual pressure ammonia process". Synthesis gas and ammonia may be generated simultaneously at two pressure levels. One advantage is a particularly high production output, in particular more than 3000 tons of ammonia per day.

Heat removal must be carried out in each synthesis step. Heat removal in the first OT synthesis section (lower pressure level) downstream of the OT reactor is typically carried out through heat exchange with high pressure boiler feed water (BFW) at a comparatively high heat exchanger pressure level of about 140 bar in a so-called BFW preheater. For heat removal during the exothermic ammonia reaction in the second loop synthesis section (higher pressure level) high pressure steam at about 125 bar is generated between the two reactors.

The following publications describe processes and plants in connection with the provision of synthesis gas or in connection with converter or reactor assemblies: US2010/0132259A1, U.S. Pat. No. 3,441,393A, DE3600432A1.

In connection with continuous efforts to further optimize plant configuration and in particular to further increase yield, energetic efficiency or else production output, it may be desirable or necessary to provide additional plant components or to reconfigure existing plant components. However, modification of the existing configuration of a dual pressure level ammonia plant is not easily possible since the individual plant components interact with one another. It is in particular necessary to decide how sufficient cooling may be achieved, especially also downstream of the OT reactor.

Thus a need exists for a synthesis gas cooling assembly and a process having the features described at the outset by means of which synthesis gas may be advantageously treated in the OT synthesis section. The present disclosure may also be considered as that of advantageously connecting the OT synthesis section with further plant components. A further advantage of the disclosure is that of achieving cooling of synthesis gas in the OT synthesis section in the production process in a dual pressure level ammonia plant in an efficient and reliable manner, in particular while maintaining the highest possible plant engineering flexibility.

DETAILED DESCRIPTION

Figure 1:
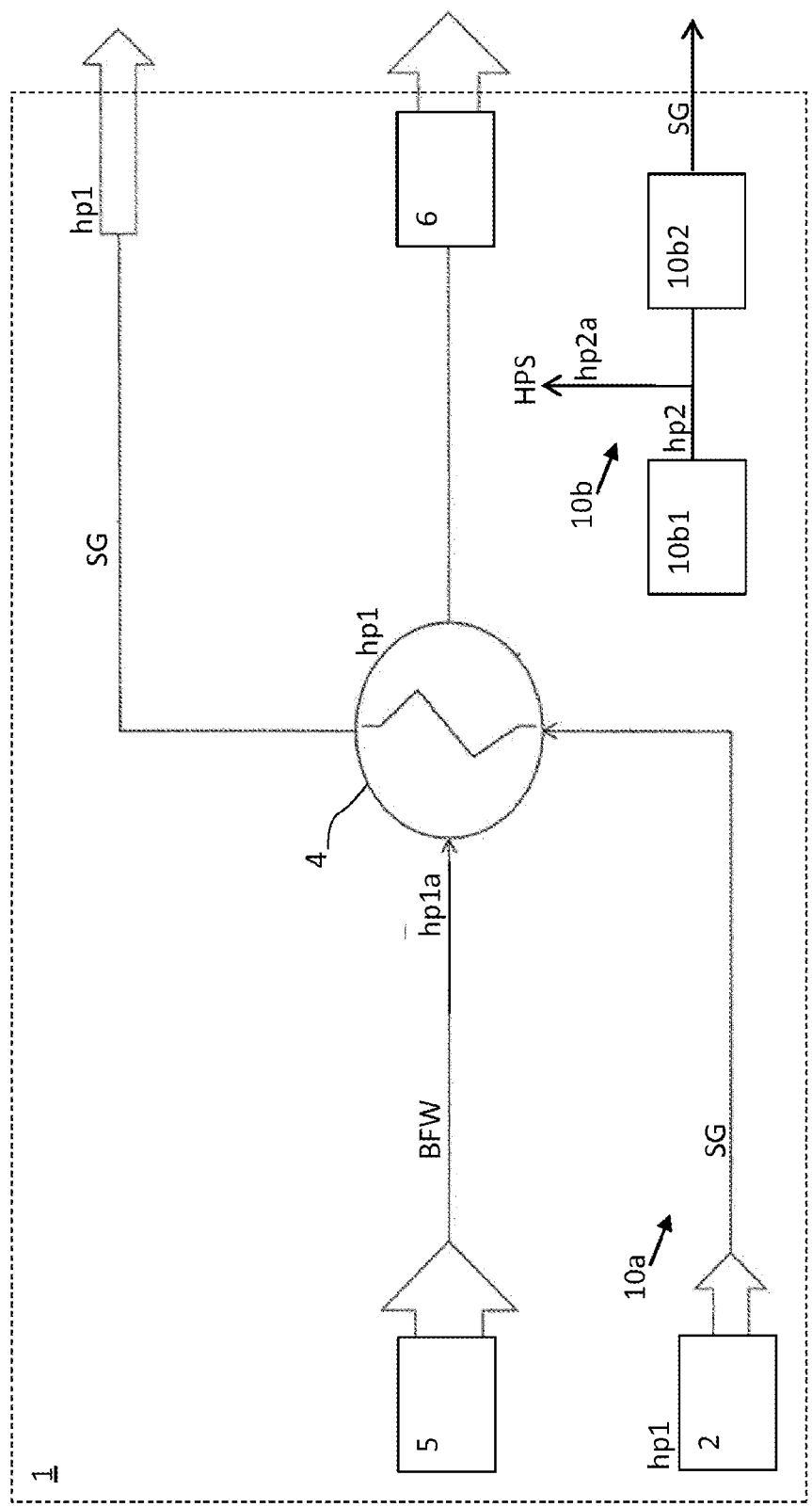
FIG. 1 is a schematic diagram of the configuration of a dual pressure level ammonia plant.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a synthesis gas cooling assembly for cooling of synthesis gas in a first of two synthesis sections having a relatively lower high pressure level of a dual pressure level ammonia plant and to a process for producing synthesis gas with this type of cooling. The invention further relates to the use of cooling medium, in particular also the use of at least one plant component for providing or for utilizing the cooling medium. The invention especially relates to an assembly and a process according to the preamble of the respective claim.

In some examples, a process for producing synthesis gas may be in a dual pressure level ammonia plant having a first synthesis section operated in once through (OT) fashion at a first relatively lower high pressure level and having a second synthesis section operated in recirculating fashion at a second relatively higher high pressure level, wherein in the first synthesis section downstream of an OT reactor of the first synthesis section the synthesis gas is cooled using cooling medium at a pressure level below the first high pressure level, in particular at a pressure level in the range from 50 to 75 bar. This provides a high energy efficiency and a good yield in the synthesis. High reliability is a further great advantage. A risk of cooling medium passing into the first synthesis section can be effectively reduced or completely eliminated. In particular the cooling of synthesis gas in the first synthesis section may be effected very efficiently while also achieving high reliability and energetic advantages. This gives rise to novel, economically or energetically advantageous plant configurations. The first high pressure level is lower relative to the second high pressure level, for example by 50%, i.e. for example in the ratio of about 100 bar to about 200 bar.

In one embodiment the cooling medium is provided as steam, in particular generated from boiler feed water. This allows advantageous process and plant configurations.

Steam may be generated from boiler feed water using the medium pressure steam generator, in particular when during the cooling of synthesis gas by indirect heat transfer in the medium pressure steam generator heat is transferred to the boiler feed water until the boiler feed water undergoes a phase change from liquid to gaseous.

In one embodiment the heat transfer proceeds via at least partial phase changing of the cooling medium from liquid to gaseous. This can provide steam which may still be utilized downstream in the plant.

In one embodiment in the first synthesis section the synthesis gas is passed to at least one further OT reactor of the first synthesis section after cooling. This can in particular also increase the ammonia yield.

According to the invention the cooling medium is provided at a pressure level below the first high pressure level or the cooling is effected by means of the medium pressure steam generator. This results in numerous process and plant engineering advantages, especially in terms of reliability and in terms of energetic aspects.

In one embodiment the cooling medium is provided at or by means of a medium pressure steam generator comprising at least one dual phase heat exchanger means which is traversed by synthesis gas upstream of the/of a further OT reactor, in particular cooling medium generated from boiler feed water. This makes it possible to realize a process which may be readily incorporated into existing plant configurations. The heat exchanger means is preferably also adapted for steam generation. The heat exchanger means may also assume the function of a medium pressure steam generator.

Heat exchange may take place in a heat exchanger means using cooling medium at a pressure level below the pressure level of the first synthesis section. Cooling medium may be passed through the heat exchanger means between the first and the second or a further OT reactor of the first synthesis gas section in such a way that cooled synthesis gas can be provided at the second OT reactor. A third or fourth OT reactor may optionally also be provided. The ammonia yield decreases with each OT reactor stage but depending on the type of the process it can increase the absolute yields and also enhance plant flexibility.

It is also possible to provide a further medium pressure steam generator, in particular between a second and a third OT reactor. It has been found that the temperature level at the outlet from an OT reactor is thermodynamically particularly suitable for the preheating of high pressure boiler feed water.

In particular the cooling may be effected using medium pressure steam generated from boiler feed water of the ammonia plant in a heat exchanger means arranged between the OT reactors, for example at a pressure of 50 to 75 bar.

The medium pressure steam may be generated without any need for subsequent superheating.

The medium pressure steam may remain as saturated steam, in particular for use in a process condensate stripper. This can also reduce the demand of the process condensate stripper for superheated medium pressure steam from a medium pressure steam rail.

Heat transfer from hot synthesis gas to colder boiler feed water can take place in the heat exchanger means. This causes the boiler feed water to evaporate, thus forming medium pressure steam. The heat exchanger means and the medium pressure steam generator may optionally be provided by the same plant component.

In one embodiment the cooling medium is passed to a process condensate stripper of the ammonia plant once heat exchange with the synthesis gas has been effected. This allows the demand for steam to be at least partially covered by the cooling of the synthesis gas.

In one embodiment steam is generated from boiler feed water by means of the medium pressure steam generator when during the cooling of synthesis gas in the medium pressure steam generator heat is transferred to the boiler feed water.

In one embodiment the cooling medium is passed to a primary reformer of the ammonia plant once heat exchange with the synthesis gas has been effected. This allows the efficiency and economy of the plant to be optimized too.

In one embodiment the cooling medium is provided to the ammonia plant in the form of boiler feed water and in a medium pressure steam generator at least partially converted into comparatively dry steam for further processing in the plant. This also provides an efficient plant configuration and a process that may be advantageously integrated into the entire plant.

Depending on the composition of the supplied cooling medium a blow down may be provided in the steam generation, in particular to avoid unevaporable constituents of the boiler feed water (for example lubricating oil from the boiler feed water pump or deposits from pipelines) from accumulating in the bottom of the steam generator and impairing heat transfer. Blowdown from the bottom of the medium pressure steam generator may be passed to a condensate drum and flashed therein to utilize any remaining energy for the generation of low pressure steam. This too contributes to an energy efficient plant concept.

In one embodiment decompressed cooling medium or cooling medium for decompression is diverted from the first synthesis section to a condensate drum of the ammonia plant, in particular downstream of the/of a medium pressure steam generator. This is allows discharging of blow down liquid.

According to the invention the abovementioned object is also achieved by a logic unit adapted for performing a process described hereinabove, wherein the logic unit is adapted for monitoring or controlling the pressure of the cooling medium to a level below the pressure of the first synthesis section. This makes it possible for individual process parameters to be monitored and controlled.

According to the invention the abovementioned object is also achieved by a synthesis gas cooling assembly for heat removal from synthesis gas in a first of two synthesis sections having a relatively lower high pressure level of a dual pressure level ammonia plant, in particular adapted for performing a process described hereinabove, wherein the cooling assembly is adapted for providing cooling medium at a pressure level below the high pressure level of the first synthesis section, in particular at a pressure of less than 80 percent or 75 percent of the high pressure level of the first synthesis section. This provides the abovementioned advantages.

In one exemplary embodiment the cooling assembly is adapted for providing the cooling medium in vaporous form. This provides the abovementioned advantages.

In one exemplary embodiment the cooling assembly is adapted for providing the cooling medium downstream of a first OT reactor of the first synthesis section and upstream of a second OT reactor of the first synthesis section. This provides the abovementioned advantages.

According to the invention the synthesis gas cooling assembly comprises a medium pressure steam generator for providing the cooling medium, in particular a medium pressure steam generator comprising at least one dual phase heat exchanger means. This provides the abovementioned advantages.

The cooling medium may be provided as medium pressure steam MPS, in particular medium pressure stream generated from boiler feed water BFW from the ammonia plant. This results in plant and process engineering advantages.

The assembly may comprise at least one heat exchanger means traversable by the synthesis gas of the first synthesis section having cooling medium at a pressure level below the high pressure level of the first synthesis section, in particular at a pressure of less than 80 or 75 percent of the high pressure level of the first synthesis section. This allows for a reliable configuration even with further plant components downstream of the heat exchanger means.

The medium pressure steam generator may be in the form of a dual phase heat exchanger means or comprises at least one dual phase heat exchanger means. This also makes it possible for example to allow each of a plurality of dual phase heat exchanger means to interact with an OT reactor.

The term "dual phase heat exchanger means" is to be understood as meaning a heat exchanger means in which the cooling medium is present in at least two phases, in particular liquid and gaseous, or in which a phase change into the or from the gas phase takes place. Independently thereof the cooling medium and the medium to be cooled may comprise different phases.

In the medium pressure steam generator, in particular in the dual phase heat exchanger means the cooling medium may be at least partially in vaporous form, in particular generated from boiler feed water. This provides the abovementioned advantages.

The synthesis gas cooling assembly may in particular comprise two ammonia synthesis converters between which a gas cooling and a steam generation takes place. The synthesis gas is preferably a fully processed synthesis gas, in particular in a stoichiometric ratio optimal for the ammonia synthesis.

In one exemplary embodiment the dual phase heat exchanger means is arranged/arrangable downstream of a first OT reactor of the first synthesis section and upstream of a second OT reactor of the first synthesis section. This allows not least a high ammonia yield.

It may be desirable for a very wide variety of reasons to expand an existing first synthesis section comprising only one OT reactor by at least one further OT reactor. It has been found that two serially connected OT reactors can increase production capacity in the region of 10%.

When expanding an existing first synthesis section by a second OT reactor the low process pressure in the first synthesis section has the result that no BFW preheater can be used between the OT reactors. In contrast to the configuration chosen in the first synthesis section the BFW can or shall not be utilized for heat exchange. There is in particular a need to avoid the possibility that due to the higher pressure of the BFW in the case of a pipe leak in the BFW preheater water would pass onto an NH3 catalyst provided in the second OT reactor and result in the deactivation thereof. This risk in particular determines that the cooling of the synthesis gas in a BFW preheater can take place only downstream of an OT reactor.

The pressure difference between the BFW pressure and the first synthesis section is too great for the use of the BFW as cooling medium to be useful or realizable in a manner advantageous in terms of process engineering. As a result the BFW pressure may be controlled to an appropriate level, for example 50 to 75 bar, upstream of the cooling assembly, in particular in a pass-through valve, so that the use of the BFW as cooling medium does not pose a risk. Any leak would then only result in synthesis gas passing onto the steam side.

Instead of a BFW preheater operated at high pressure markedly above the process pressure of the first synthesis section medium pressure steam may be generated at a pressure level which is below the process pressure of the first synthesis section, for example at a pressure of about 50 to 75 bar. In many plant configurations this medium pressure saturated steam may be utilized in not particularly efficient fashion for propulsion of turbines for example but is also suitable for use in a process condensate stripper or medium pressure condensate stripper. Lastly, the generated steam may also be utilized as process steam in a primary reformer of the plant.

Any leak in a medium pressure steam generator would thus have the effect that synthesis gas passes onto the medium pressure steam side of the heat exchanger assembly. However, in this assembly mass transfer in the opposite direction can be prevented despite a leak through the choice of pressure ratios. Thus contamination of the particular OT reactor and in particular an impairment of catalyst material can be precluded.

It has been found that it is particularly advantageous to orient the medium pressure steam generator/the heat exchanger means vertically ("upright"), i.e. with a vertically oriented tube bundle and pressure vessel. This provides effective phase separation. Build height may be utilized to ensure comprehensive phase separation on account of density differences and gravity. This makes it possible to provide comparatively dry steam without an additional liquid separator.

The classical second synthesis section may in particular be operated at a pressure of about 200 bar. The first (OT) synthesis section is in particular operated at about 100 bar. The medium pressure steam may be provided at a level below that of the process pressure of the first synthesis section, for example at about 50 to 75 bar, i.e. corresponding for example to not more than 75 percent of the pressure of the first synthesis section. Medium pressure steam may in particular be utilized instead of cooling medium from a BFW preheater operated a high pressure.

Steam from the medium pressure steam generator decompressed once heat exchange has been effected may be passed to a condensate drum, in particular to obtain low pressure steam therein (flash).

The term "OT reactor" is to be understood as meaning a "once through" reactor, i.e. a once-traversed plant component or a once-traversed synthesis section, in particular arranged upstream of the synthesis circuit of a dual pressure level ammonia plant.

In one exemplary embodiment the cooling assembly comprises a medium pressure steam generator arrangable/arranged serially upstream from a process condensate stripper of the ammonia plant and couplable/coupled to the process condensate stripper, in particular arrangable/arranged downstream of a boiler feed water pump of the ammonia plant. This type of assembly allows for an advantageous plant concept, also in energetic terms.

The medium pressure steam generator comprises an inner preheating zone so that the boiler feed water need not necessarily be supplied boiling.

Medium pressure steam (saturated steam) may be generated in at least one heat exchanger in order then to be used without superheating in particular also in the process condensate stripper.

In summary the synthesis gas cooling assembly may comprise at least one medium pressure steam generator traversable by the synthesis gas of the first synthesis section, wherein the medium pressure steam generator is in the form of a dual phase heat exchanger means or comprises at least one dual phase heat exchanger means and wherein the cooling medium in the medium pressure steam generator, in particular in the dual phase heat exchanger means, is at least partially in vaporous form, in particular generated from boiler feed water.

In one exemplary embodiment a/the medium pressure steam generator of the cooling assembly which provides the cooling medium is connectable/connected to a primary reformer of the ammonia plant. This results in the abovementioned advantages.

In an exemplary embodiment a/the medium pressure steam generator of the cooling assembly which provides the cooling medium is couplable/coupled to a process condensate stripper of the ammonia plant. This provides the abovementioned advantages.

In one exemplary embodiment a/the medium pressure steam generator of the cooling assembly which provides the cooling medium is couplable/coupled to a condensate drum of the ammonia plant, in particular by means of a decompression conduit for decompressed cooling medium or cooling medium for decompression. This makes it possible to produce low pressure steam. This provides the abovementioned advantages.

In one exemplary embodiment the heat exchanger means comprises at least two outlets comprising one outlet to the/to a process condensate stripper of the ammonia plant and one outlet to the/to a condensate drum of the ammonia plant. This provides the abovementioned advantages.

In one exemplary embodiment the cooling assembly comprises at least two discharge conduits comprising one discharge conduit for the cooling medium to the/to a process condensate stripper of the ammonia plant and comprising at least one discharge conduit for the cooling medium to the/to a condensate drum of the ammonia plant. This allows the medium pressure steam to be utilized downstream in various ways once heat exchange has been effected, in particular at least in the process condensate stripper and for providing low pressure steam.

In one exemplary embodiment the heat exchanger means comprises at least one vertically oriented tube bundle. This allows phase separation to be carried out effectively.

It has been found that the generation of steam inside the heat exchanger means provides a very wide variety of advantages. In particular, a pressure reduction (throttle evaporation) may be eschewed. Severe pressure variations may also be avoided. Mechanical stresses in a throttling can be avoided. The pump output of the boiler feed water pump may be utilized and the steam may be provided at a comparatively high pressure level so that the steam can also be sent for further use, in particular in a low pressure assembly of the plant (typically at least 4 bar absolute).

According to the invention the abovementioned object is also achieved by a dual pressure level ammonia plant having a first synthesis section comprising at least one OT reactor, in particular at least two OT reactors, and having a second synthesis section having a plurality of loop reactors and having at least one synthesis gas cooling assembly described hereinabove. This results in the abovementioned advantages.

According to the invention the abovementioned object is also achieved by the use of a medium pressure steam generator for providing medium pressure saturated steam for cooling of synthesis gas downstream of an OT reactor, in particular between at least two OT reactors, of a synthesis section having a relatively lower high pressure level of a dual pressure level ammonia plant, in particular in a synthesis gas cooling assembly described hereinabove, in particular at a pressure of less than 80 or 75 percent of the relatively lower high pressure level of the synthesis section. This results in the abovementioned advantages.

According to the invention the abovementioned object is also achieved through the use of a medium pressure steam generator for providing medium pressure saturated steam to a process condensate stripper of a dual pressure level ammonia plant, in particular in a synthesis gas cooling assembly described hereinabove, in particular for medium pressure steam having a pressure of less than 80 or 75 percent of a relatively lower high pressure level of the dual pressure level ammonia plant. This results in the abovementioned advantages.

According to the invention the abovementioned object is also achieved through the use of a medium pressure steam generator fed with boiler feed water comprising at least one dual phase heat exchanger means between at least two OT reactors of a synthesis section having a relatively lower high pressure level of a dual pressure level ammonia plant for cooling of synthesis gas between the OT reactors, in particular in a synthesis gas cooling assembly described hereinabove This results in the abovementioned advantages.

According to the invention the abovementioned object is also achieved through the use of medium pressure steam utilized for cooling of synthesis gas between at least two OT reactors of a synthesis section having a relatively lower high pressure level of a dual pressure level ammonia plant as process steam in a primary reformer of the dual pressure level ammonia plant, in particular in a synthesis gas cooling assembly described hereinabove. This results in the abovementioned advantages.

According to the invention the abovementioned object is also achieved through the use of a dual phase heat exchanger means as a medium pressure steam generator downstream of a first OT reactor of a synthesis section having a relatively lower high pressure level of a dual pressure level ammonia plant for providing cooling medium at a pressure level below the high pressure level of the synthesis section, in particular for expanding the ammonia plant by at least one further OT reactor downstream of the heat exchanger means. This results in the abovementioned advantages.

FIG. 1 shows a dual pressure level ammonia plant 1 having two synthesis sections, namely a first synthesis section 10a operated in once through fashion at a first high pressure level hp1 of about 100 bar and a second synthesis section 10b operated in recirculating fashion at a second high pressure level hp2 of about 200 bar. Arranged in the first synthesis section 10a is an OT reactor 2 and arranged in the second synthesis section 10b are a first loop reactor 10b1 and a second loop reactor 10b2.

Arranged downstream of the OT reactor 2 is a boiler feed water preheater 4 operated at high pressure which allows for heat exchange with synthesis gas SG and is operated at a heat exchanger pressure level hp1a of about 140 bar. The boiler feed water BFW may be provided by means of a feed water pump 5 and once heat exchange has been effected the preheated boiler feed water BFW may be passed on into a high pressure steam drum 6.

The preheater 4 operated a high pressure is a non-phase change heat exchanger. The preheater 4 is in the form of a horizontal ("flat-lying") heat exchanger. In this assembly a conveying height for a boiler feed water pump may be kept low, thus saving energy.

In process engineering terms the OT synthesis section 10a is arranged upstream of the synthesis circuit 10b. Provided between the synthesis sections is a cooling sector for condensing ammonia produced in the OT synthesis out of the synthesis gas. The ammonia produced may be separated from the synthesis gas in an OT separator. A synthesis gas compressor may be used to increase the pressure from the relatively lower high pressure level of the OT synthesis to the relatively higher high pressure level of the synthesis circuit 10b.

The figures use the following abbreviations: medium pressure mp, low pressure lp, synthesis gas SG, boiler feed water BFW, high pressure steam HPS, medium pressure steam MPS, low pressure steam LPS.

Figure 2:
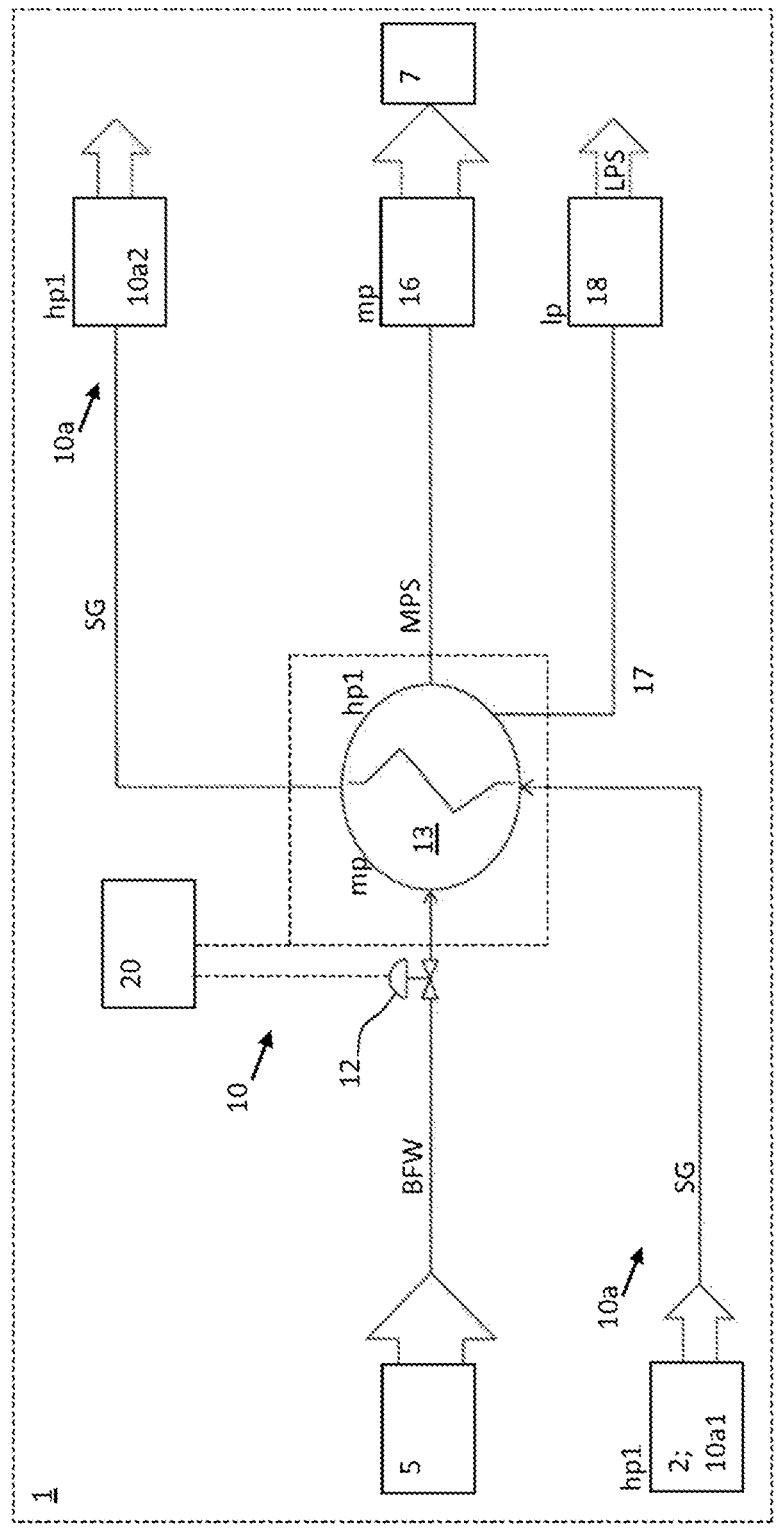
FIG. 2 is a schematic diagram of the configuration of a synthesis gas cooling assembly according to an exemplary embodiment in conjunction with a dual pressure level ammonia plant.

FIG. 2 shows a synthesis gas cooling assembly 10 having two synthesis sections of which only the first synthesis section 10a at the first high pressure level is shown. The first synthesis section 10a comprises a first OT reactor 10a1 and at least one further OT reactor 10a2 between which OT reactors a medium pressure steam generator means 13 having a heat exchanger means is arranged. Arranged upstream of the medium pressure steam generator means 13 is a pass-through valve 12, in particular having a throttle or a valve unit.

The medium pressure steam generator means 13 is fed with boiler feed water from a pump 5. The medium pressure steam generator means 13 is coupled to a process condensate stripper 16 and/or a primary reformer 7. The medium pressure steam generator means 13 is further coupled to a condensate drum 18 via a decompression conduit/a decompression path 17, in particular in the form of a blow down conduit.

A logic unit 20 coupled to the pass-through valve 12 and/or to the medium pressure steam generator means 13 allows for monitoring and control of pressure and flow. In other words: The logic unit 20 is optionally in communication with the valve 12 which may be operated as an actuator for controlling the pressure at the inlet into the heat exchanger means/the steam generator 13.

Compared to FIG. 1 two conduits are provided downstream of the medium pressure steam generator means 13, said conduits leading to the process condensate stripper 16 and to the condensate drum 18. By contrast, no steam is generated in the BFW preheater 4 shown in FIG. 1. A blow down is not necessary.

In contrast to a preheater 4 operated at high pressure in which no phase change takes place the medium pressure steam generator 13/the steam generator-heat exchanger thus contains two regions for a liquid phase and a gaseous phase respectively. The medium pressure steam generator may be in the form of a vertical ("upright") heat exchanger means in which the tube bundle and the surrounding pressure vessel are vertically oriented. This allows effective phase separation especially for a large build height, in particular on account of specific density differences between steam and boiler feed water and on account of gravitational forces. This allows steam to be provided at the outlet in a sufficiently dry form. An additional liquid separator is not necessary.

LIST OF REFERENCE NUMERALS 1 dual pressure level ammonia plant
2 OT reactor
4 preheater operated at high pressure (BFW preheater)
5 feed water pump
6 high pressure steam drum
7 primary reformer
10 synthesis gas cooling assembly
10a first synthesis section at first high pressure level
10a1 first OT reactor
10a2 further, especially second, OT reactor
10b second synthesis section at second high pressure level
10b1 first loop reactor
10b2 second loop reactor
12 pass-through valve, especially throttle or valve unit
13 medium pressure steam generator means, especially having heat exchanger means
16 process condensate stripper, especially medium pressure condensate stripper
17 decompression conduit/decompression path, especially blow down conduit
18 condensate drum
20 logic unit
hp1 first high pressure level, especially about 100 bar in the first synthesis section
hp2 second high pressure level, especially about 200 bar in the second synthesis section
hp1a heat exchanger pressure level/BFW pressure in the first synthesis section
hp2a pressure level of high pressure steam in the second synthesis section
mp medium pressure
lp low pressure
SG synthesis gas
BFW boiler feed water
HPS high pressure steam
MPS medium pressure steam, especially saturated medium pressure steam
LPS low pressure steam/decompressed steam

What is claimed is:

1. A method of producing synthesis gas in a dual pressure level ammonia plant, comprising:
   operating, in once through fashion, a first synthesis section at a first high pressure level,
   operating, in recirculating fashion, a second synthesis section at a second high pressure level, wherein the pressure of the second high pressure level is higher than the first high pressure level,
   cooling the synthesis gas in the first synthesis section downstream of an OT reactor of the first synthesis section using a cooling medium at a pressure level below the first high pressure level, and
   providing, by a medium pressure steam generator, said cooling medium at a pressure level below the first high pressure level or wherein the cooling is effected by the medium pressure steam generator.

2. The method of claim 1, wherein the pressure level is in the range from about 50 to about 75 bar.

3. The method of claim 1, wherein the cooling medium is steam.

4. The method of claim 3, wherein the steam is from boiler feed water.

5. The method of claim 1, wherein in the first synthesis section the synthesis gas is passed to at least one further OT reactor of the first synthesis section after cooling.

6. The method of claim 1, wherein the cooling medium is provided at or by the medium pressure steam generator comprising at least one dual phase heat exchanger which is traversed by synthesis gas upstream of the OT reactor or a further OT reactor, and/or wherein steam is generated from boiler feed water by the medium pressure steam generator when during the cooling of synthesis gas in the medium pressure steam generator heat is transferred to the boiler feed water.

7. The method of claim 1, wherein the cooling medium is passed to a process condensate stripper of the ammonia plant once heat exchange with the synthesis gas has been effected and/or wherein the cooling medium is passed to a primary reformer of the ammonia plant once heat exchange with the synthesis gas has been effected.

8. The method of claim 1, wherein the cooling medium is diverted from the first synthesis section to a condensate drum of the ammonia plant downstream of the medium pressure steam generator.

9. A synthesis gas cooling assembly for heat removal from synthesis gas, comprising:
two synthesis sections,
a first one of the two synthesis sections having a relatively lower high pressure level of a dual pressure level ammonia plant relative to the second one of the two synthesis sections,
the cooling assembly configured to provide cooling medium at a pressure level below the high pressure level of the first synthesis section,
a medium pressure steam generator configured to provide the cooling medium at the pressure level below the high pressure level of the first synthesis section, and
two discharge conduits,
wherein one of the two discharge conduits is configured to provide the cooling medium to a process condensate stripper of the ammonia plant and the other of the two discharge conduits is configured to provide the cooling medium to a condensate drum of the ammonia plant.

10. The synthesis gas cooling assembly of claim 9, further comprising a cooling arrangement that is configured to provide the cooling medium in vaporous form.

11. The synthesis gas cooling assembly of claim 9, further comprising a cooling arrangement that is configured to provide the cooling medium downstream of a first OT reactor of the first synthesis section and upstream of a second OT reactor of the first synthesis section.

12. The synthesis gas cooling assembly of claim 9, wherein the synthesis gas cooling arrangement comprises the medium pressure steam generator comprising at least one dual phase heat exchanger.

13. The synthesis gas cooling assembly of claim 9, wherein the medium pressure steam generator of the cooling assembly which provides the cooling medium is connectable to a primary reformer of the ammonia plant; and/or wherein the medium pressure steam generator of the cooling assembly which provides the cooling medium is couplable/coupled to a process condensate stripper of the ammonia plant.

14. A dual pressure level ammonia plant having a first synthesis section comprising at least one OT reactor and having a second synthesis section having a plurality of loop reactors and having at least one synthesis gas cooling assembly according to claim 9.

* * * * *